(12) United States Patent
Sugimoto et al.

(10) Patent No.: US 8,583,713 B2
(45) Date of Patent: Nov. 12, 2013

(54) PHYSICAL RANDOM NUMBER GENERATION DEVICE

(75) Inventors: Ichiro Sugimoto, Hadano (JP); Yoshiyuki Oinuma, Minamiashigara (JP)

(73) Assignee: Hitachi, Ltd., Tokyo (JP)

( * ) Notice: Subject to any disclaimer, the term of this patent is extended or adjusted under 35 U.S.C. 154(b) by 615 days.

(21) Appl. No.: 12/845,044

(22) Filed: Jul. 28, 2010

(65) Prior Publication Data

US 2011/0066669 A1 Mar. 17, 2011

(30) Foreign Application Priority Data

Sep. 14, 2009 (JP) ................................. 2009-211250

(51) Int. Cl.
*G06F 7/58* (2006.01)
(52) U.S. Cl.
USPC ......................................................... 708/255
(58) Field of Classification Search
None
See application file for complete search history.

(56) References Cited

U.S. PATENT DOCUMENTS

| 7,249,935 | B2 * | 7/2007 | Pedersen | 416/146 R |
| 7,860,912 | B1 * | 12/2010 | Gyugyi et al. | 708/254 |
| 2002/0184273 | A1 * | 12/2002 | Katsunori | 708/250 |
| 2007/0033242 | A1 * | 2/2007 | Wilber | 708/250 |
| 2008/0313250 | A1 * | 12/2008 | Lee et al. | 708/255 |
| 2010/0005128 | A1 * | 1/2010 | Ergun | 708/251 |
| 2010/0146025 | A1 * | 6/2010 | Ergun | 708/251 |
| 2010/0332574 | A1 * | 12/2010 | Herbert et al. | 708/251 |
| 2011/0066669 | A1 * | 3/2011 | Sugimoto et al. | 708/251 |

FOREIGN PATENT DOCUMENTS

| JP | 3680091 B2 | 5/2005 |
| JP | 2007-323135 A | 12/2007 |

\* cited by examiner

*Primary Examiner* — David H Malzahn
(74) *Attorney, Agent, or Firm* — Mattingly & Malur, PC

(57) ABSTRACT

A physical random number generation device includes a physical random number generation source which generates a white noise, an AD conversion module which inputs the white noise for conversion to a physical prime random number as digital data, a physical prime random number sequence generation module which inputs two or more physical prime random numbers to generate a physical prime random number sequence, a white noise array generation module for inputting the physical prime random number sequence and for generating a white noise array, a white noise composition module for generating multiple physical random numbers from the input white noise array, and an interface for externally outputting the generated physical random numbers as physical random number data. With this arrangement, multiple physical random numbers are generated at high speeds from the physical prime random number(s) taken out of the physical random number generation source as digital data.

4 Claims, 7 Drawing Sheets

FIG.5

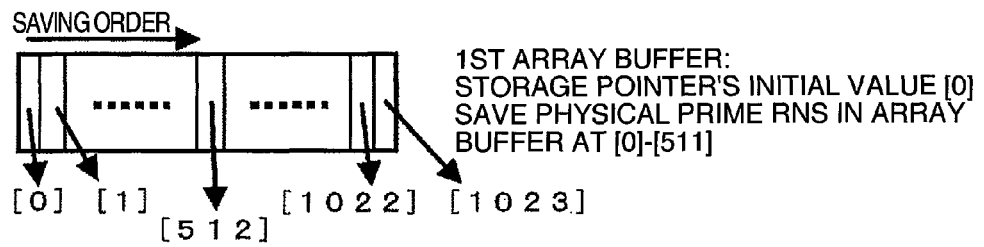

1ST ARRAY BUFFER:
STORAGE POINTER'S INITIAL VALUE [0]
SAVE PHYSICAL PRIME RNS IN ARRAY
BUFFER AT [0]-[511]

IN NEXT 512 CYCLES,
SAVE PHYSICAL PRIME RNS IN ARRAY
BUFFER AT [512]-[1024]

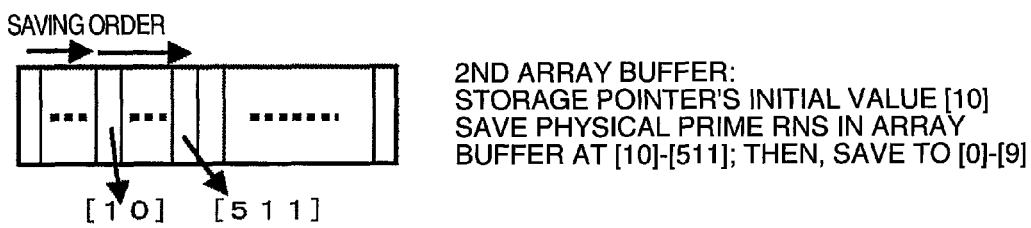

2ND ARRAY BUFFER:
STORAGE POINTER'S INITIAL VALUE [10]
SAVE PHYSICAL PRIME RNS IN ARRAY
BUFFER AT [10]-[511]; THEN, SAVE TO [0]-[9]

IN NEXT 512 CYCLES,
SAVE PHYSICAL PRIME RNS IN ARRAY
BUFFER AT [522]-[1023]; THEN,
SAVE TO [512]-[521]

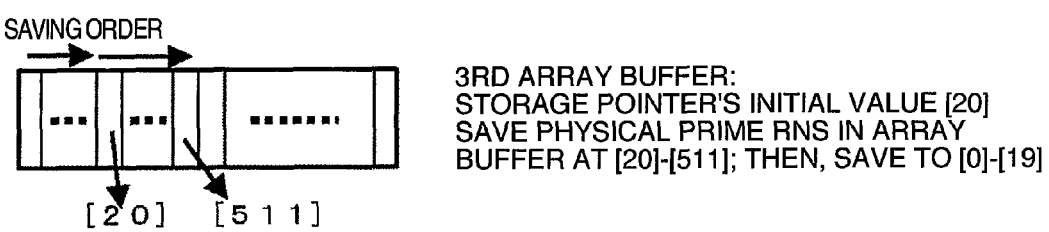

3RD ARRAY BUFFER:
STORAGE POINTER'S INITIAL VALUE [20]
SAVE PHYSICAL PRIME RNS IN ARRAY
BUFFER AT [20]-[511]; THEN, SAVE TO [0]-[19]

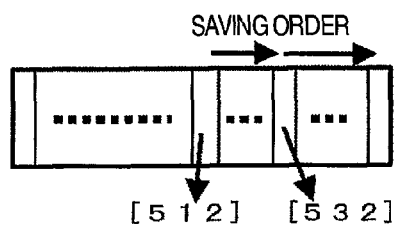

IN NEXT 512 CYCLES,
SAVE PHYSICAL PRIME RNS IN ARRAY
BUFFER AT [532]-[1023]; THEN,
SAVE TO [512]-[531]

FIG.6
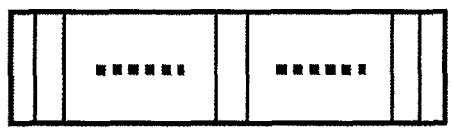
1ST 1024 CYCLES:
NO OUTPUT AS NO PHYSICAL RN IS SAVED
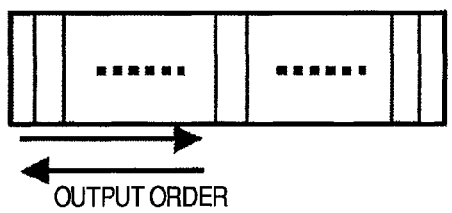
OUTPUT ORDER
2ND 1024 CYCLES:
VALUE OUTPUT IN ORDER OF [0]-[511],
[0], AND [511]-[1] IN ARRAY BUFFER
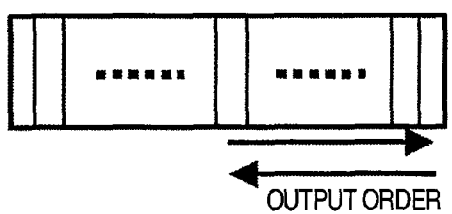
OUTPUT ORDER
3RD 1024 CYCLES:
VALUE OUTPUT IN ORDER OF [512]-[1023],
[512], AND [1023]-[513] IN ARRAY BUFFER

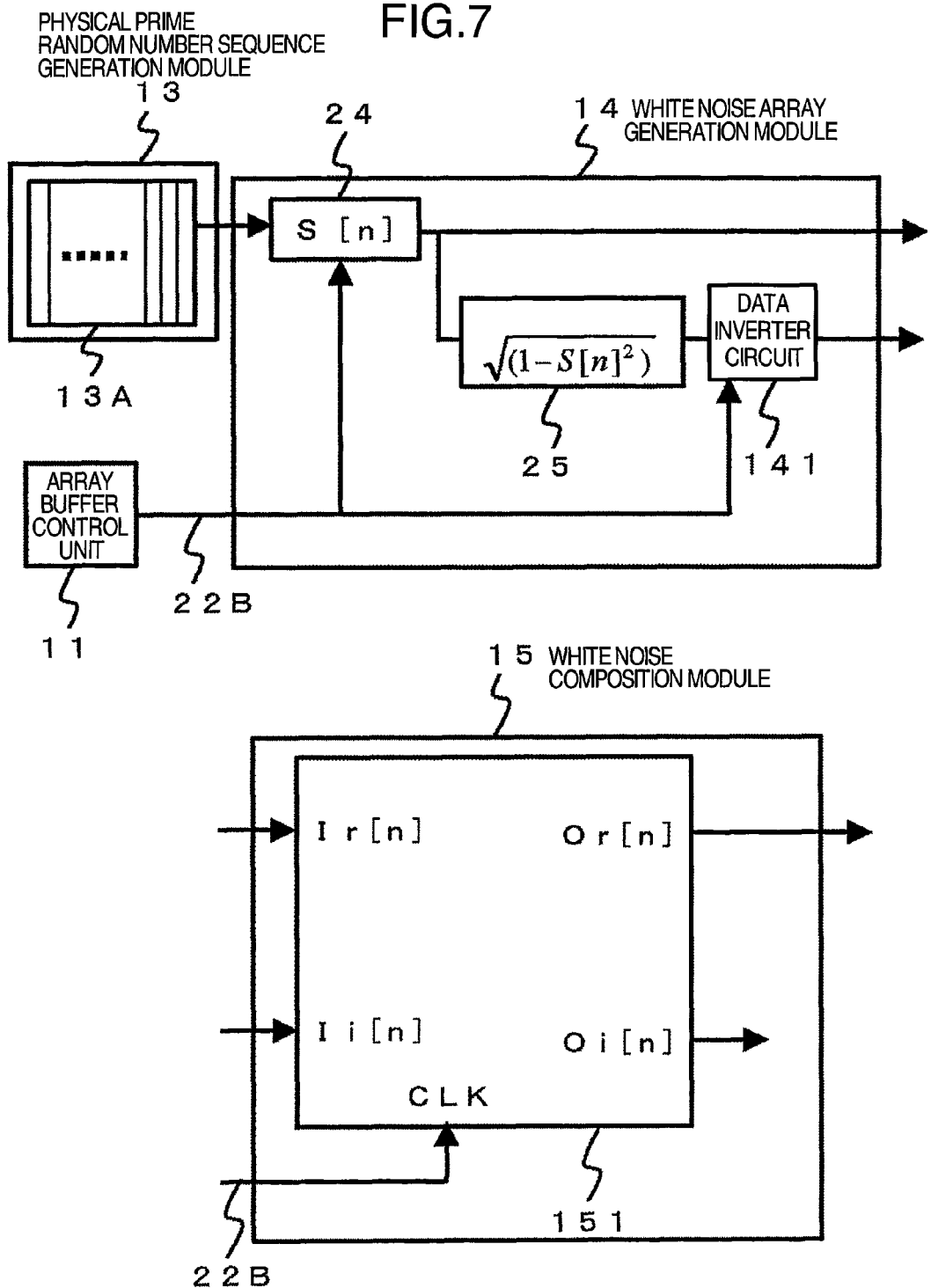

PHYSICAL RANDOM NUMBER GENERATION DEVICE

INCORPORATION BY REFERENCE

The present application claims priority from Japanese application JP 2009-211250 filed on Sep. 14, 2009, the content of which is hereby incorporated by reference into this application.

TECHNICAL FIELD

The present invention relates generally to physical random number generation technologies, and more particularly to a physical random number generation technique suitable for use in achievement of high randomness and speed enhancement of generation process in the case of generating random numbers by hardware configurations while lessening the scale of electrical/electronic circuitry.

BACKGROUND ART

In the field of scientific and engineering calculations, numeric simulations and statistics-related computations using physical random numbers, which are becoming larger in scale and higher in accuracy, it is required to enhance the processing ability or "processability" of an electronic computer used therefor and also to generate at high speeds a physical random number or numbers to be input to the computer. Failing to satisfy these requirements would result in the lack of an ability to obtain any intended calculation results.

In order to enable the computer to exert its full level of processability, it is needed to employ a physical random number generation device of the type having high speed performance consistent with the processability of the computer.

Japanese Patent No. 3680091 discloses therein a technique for using physical phenomena with randomness to generate physical random numbers by means of hardware. In addition, JP-A-2007-323135 discloses therein a physical random number generation device capable of generating high-quality physical random numbers at low costs.

SUMMARY OF INVENTION

However, with improvements in processability or throughputs of electronic computers in recent years, it is becoming more difficult or almost impossible to permit an electronic computer to fully exert its own processability unless the physical random numbers for input thereto are generated at high speeds. Problems to be solved in this respect are as follows. (1) Although the physical random number generated is taken, by analog-to-digital (AD) conversion, out of a physical random number generation source as digital data, an AD conversion circuit has a limit in increasing the amount of outputtable digital data by heightening the operating frequency unlike existing digital circuits. (2) The AD converter circuit is typically larger in circuit scale than digital circuits; so, it is difficult to mount a plurality of AD converter circuits together on a limited size of chip substrate. (3) As a practical problem relating to the use of an AD conversion module for taking out of a white noise to be generated from a physical random number generation source a randomness-enhanced physical elementary/prime random number (referred to as "physical prime random number" hereinafter) which is in the form of a digital data, noise components which are drawn from the physical random number generation source contain shot noises and flicker noises in addition to the white noise, and the white noise will loose its purity during passing through several analog circuits, such as an amplifier, filter, etc. Unwanted biasing can also take place due to variations of internal parts and components of the AD converter circuit.

It is therefore an object of this invention to provide a hardware-based physical random number generation technique capable of achieving high randomness and high-speed physical random number generation by use of small-scale generator circuitry.

A physical random number generation device incorporating the principles of this invention is arranged to have a physical random number generation source operative to generate a white noise, an AD conversion module for inputting the white noise and for converting it to a physical prime random number in the form of digital data, a physical prime random number sequence generation module for inputting a plurality of physical prime random numbers and for generating a physical prime random number sequence, a white noise array generation module for inputting the physical prime random number sequence and for generating a white noise array, a white noise composition module for inputting the white noise array and for generating a plurality of physical random numbers, and an external output interface operative to input the plurality of physical random numbers thus generated and to externally output them as a physical random number data.

According to the physical random number generation device of this invention, its major advantage lies in the capability of achieving high randomness and high-speed physical random number generation by use of small-scale generator circuitry.

Other objects, features and advantages of the invention will become apparent from the following description of the embodiments of the invention taken in conjunction with the accompanying drawings.

BRIEF DESCRIPTION OF DRAWINGS

FIG. 5 is a diagram showing the generation of a physical prime random number sequence which is different per array buffer of the physical prime random number sequence generation module.

FIG. 6 is a diagram showing the output of a numerical value sequence from the array buffer of the physical prime random number sequence generation module.

FIG. 7 is a diagram showing the generation of a physical random number(s) by the inverse Fourier transform processing.

DESCRIPTION OF EMBODIMENTS

Figure 1:
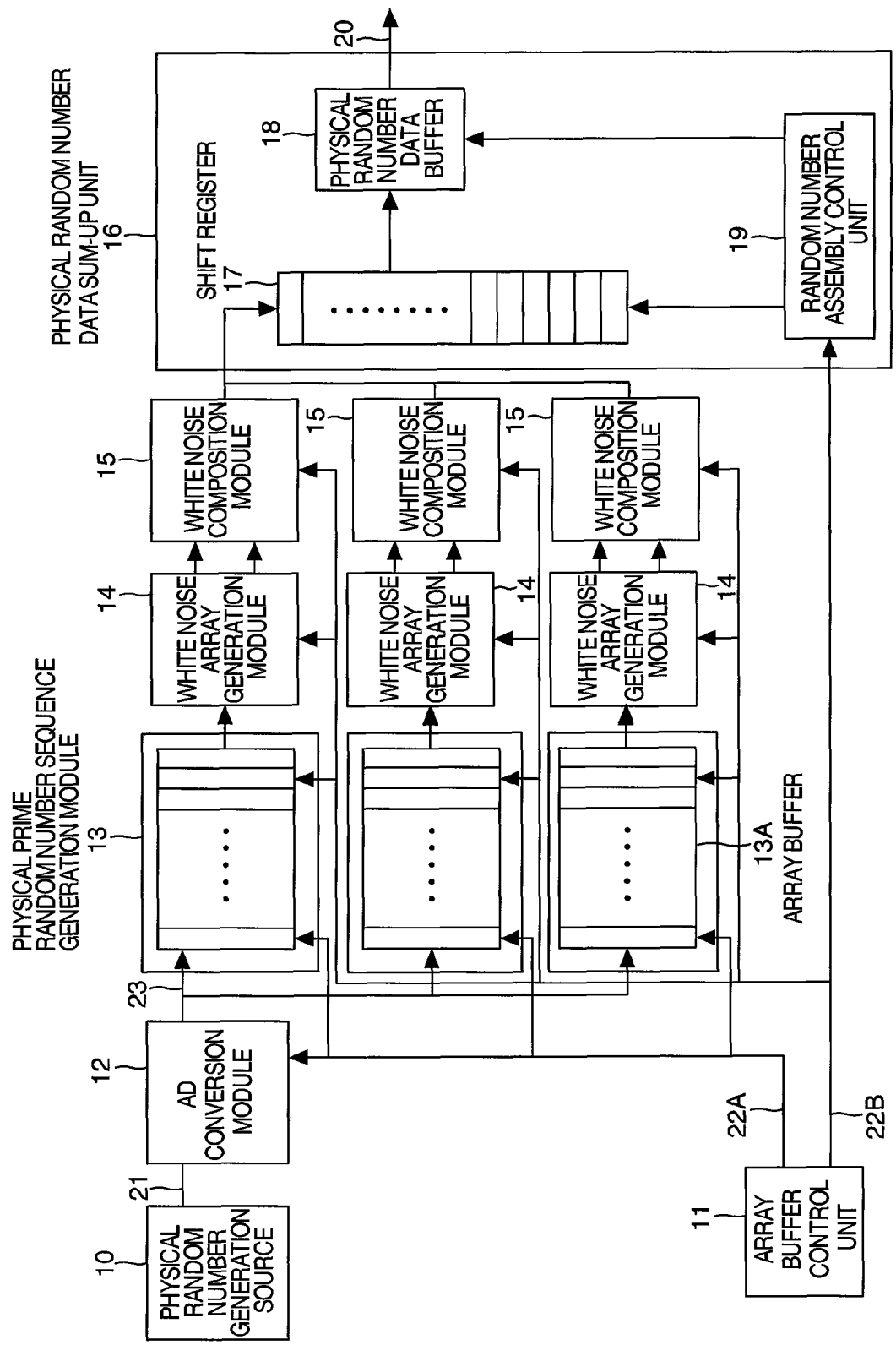
FIG. 1 is a diagram showing a basic configuration of a physical random number generation device in accordance with one embodiment of this invention.

FIG. 1 is a diagram showing an overall configuration of a physical random number generation device in accordance with one embodiment of this invention. The physical random number generation device embodying the invention is arranged to include a physical random number generation source 10 which generates a white noise 21 having the same strength in every spectrum, an analog-to-digital (AD) conversion module 12 which converts the white noise 21 into digital data, a plurality of physical prime random number sequence generation modules 13 each of which generates a physical prime random number sequence from a plurality of physical prime random numbers 23, a parallel combination of array buffers 13A each of which stores therein the physical prime random number sequence existing in a corresponding one of the physical prime random number sequence generation modules 13, a parallel combination of white noise array generation modules 14 each of which generates from the physical prime random number sequence an array of white noises as a numerical sequence in the form of a phase array per white-noise frequency component, a parallel connection of white noise composition modules 15 each of which performs white noise composition or "synthesis" with respect to the white noise array, an array buffer control unit 11 for controlling the AD conversion module 12, the physical prime random number sequence generation modules 13, the white noise array generation modules 14, the white noise composition modules 15 and a random number data assembly control unit 19, and a physical random number data sum-up unit 16 which provides an interface between the physical random number generation device and an external information processing apparatus or equipment which uses physical random numbers to be generated by the device.

More specifically, the white noise that was generated from the physical random number generation source 10 to have the same strength in every spectrum is input to the AD conversion module 12. A given bit of digital data converted by the AD conversion module 12 is for use as a physical prime random number 23. In order to create a physical random number sequence from the physical prime random number 23, the digital data is input to the array buffer 13A which stores therein a plurality of physical prime random numbers 23 as a numerical sequence. To cause the physical prime random number sequences of respective physical prime random number sequence generation modules 13 to be different from one another, the sequential order of writing the physical prime random numbers 23 is different per array buffer 13A. The white noise array generation module 14 inputs a physical prime random number sequence from its associated array buffer 13A arranged in the physical prime random number sequence generation module 13, thereby to prepare a white noise array. With this white noise array being as an input, the white noise composition module 15 performs white noise composition. Those physical random numbers as output from the plurality of white noise composition modules 15 are input to the physical random number data sum-up unit 16 and then combined together thereby. The physical random number data sum-up unit 16 is operatively responsive to receipt of a request that is externally sent thereto, for processing these physical random number data into a data takeout-facilitated form and for outputting the processing result as a physical random number(s).

Figure 3:
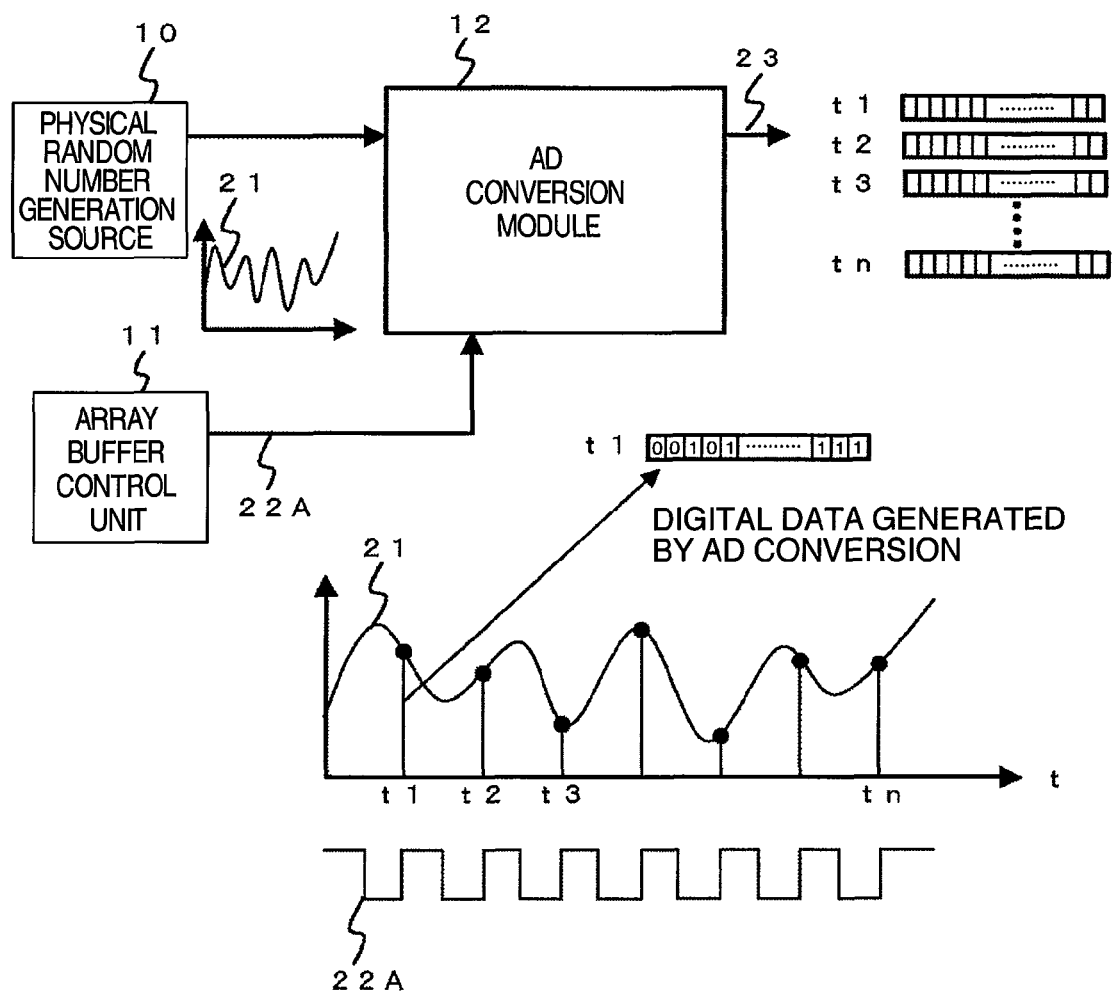
FIG. 3 is a diagram for explanation of an operation of an analog-to-digital conversion module as used in the physical random number generation device.

An operation of the physical random number generation device of this embodiment with the arrangement stated supra is as follows. First, the physical random number generation source 10 is rendered operative to generate a white noise 21 for use as the "source" of physical random numbers. As shown in FIG. 3, the white noise 21 generated is input to the AD conversion module 12. The AD conversion module 12 performs sampling of the magnitude of the white noise 21 per cycle of a clock signal A 22A and then converts a sampled value to digital data. The digital data is output from the AD conversion module 12 per cycle of the clock signal A 22A. The digital data converted by the AD conversion module 12 is handled as a physical prime random number 23. The physical prime random number 23 is supplied to each of the physical prime random number sequence generation modules 13 for generation of a physical prime random number sequence therein.

Figure 4:
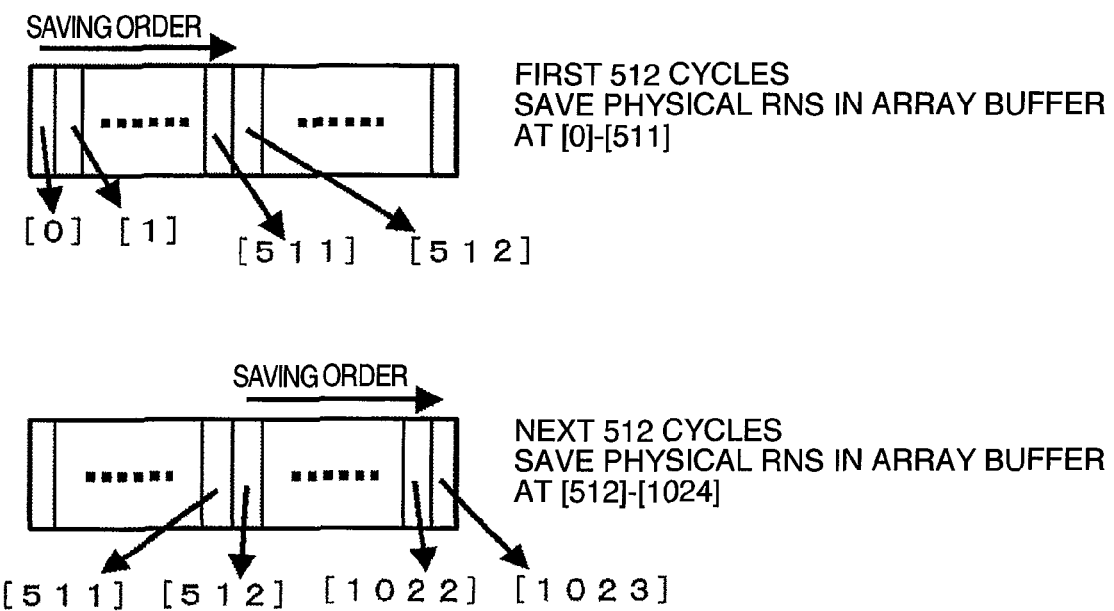
FIG. 4 is a diagram showing the generation of a sequence of physical prime random numbers in a physical prime random number sequence generation module.

The physical prime random number sequence generation is performed in a way which follows. As shown in FIG. 4, in case a physical prime random number sequence is generated from a prespecified number, e.g., 512, of input prime random number sequences, input physical prime random numbers 23 are stored as a physical prime random number sequence in the array buffer 13A at a location indicated by a pointer. The pointer is counted up in units of cycles of the clock signal A 22A. After having stored 512 input prime random numbers, one physical prime random number sequence is completed. In the next 512 cycles, another physical prime random number sequence is completed. These physical prime random number sequences generated once per elapse of 512 cycles are alternately stored in the array buffer 13A at its location indicated by the pointer and updated thereafter. In the first cycle in each 512-cycle period, a value of zero (0) is stored.

The physical prime random number sequence is arranged to become a different physical prime random number sequence by changing the initial value of a storage pointer per each array buffer 13A in each physical prime random number sequence generation module 13 as shown in FIG. 5. An output numerical sequence from the array buffer 13A is output per cycle of a clock signal B 22B. This numeric sequence becomes an input of the white noise array generation module 14.

As shown in FIG. 6, in the first appearing 1024 cycles, nothing is output. This is because of the fact that no physical prime random numbers are stored in the array buffer 13A. In a period of the next 1024 cycles, those values of from the 0-th to 511-th value of the array buffer 13A are sequentially output in ascending order; then, the 0-th value is output again; thereafter, values of from the 511-th to first value are output in descending order. A third period of the next 1024 cycles, the pointer is subjected to addition of 512; then, those values of from the 512-th to 1023-th value of the array buffer 13A are sequentially output in ascending order; then, the 512-th value is output again; thereafter, those values of from the 1023-th to 513-th value are output in descending order. In the following periods, the above-stated operations performed in the second 1024-cycle period and the third 1024-cycle period will be repeated to thereby output physical prime random number sequences. Upon input of the physical prime random number sequences, the white noise array generation module 14 generates a white noise array of 1024 pieces. The clock signal B 22B is designed to have its frequency two times greater than that of the clock signal A 22A. In other words, the white noise array is generated at a speed which is two times higher than that of the digital data to be generated by the AD conversion module 12. The white noise array is generated as a numerical sequence per white-noise frequency component in the white noise array generation module 14.

As shown in FIG. 7, the white noise array generation module 14 performs conversion to a white noise array having a real number part and an imaginary number part from the physical prime random number sequence as output from the physical prime random number sequence generation module 13 associated therewith. The real number part is for output, at a real part generator circuit 24, of a prime random number(s) greater than or equal to zero and yet less than one, which is/are created from the bit stream of each physical prime random number sequence as input from the physical prime random number sequence generation module 13. The imaginary number part is for generation, at an imaginary part generator circuit 25, of a value which is equal to the square root of a difference between 1 and a squared value of the prime random number that was input from the real part generator circuit 24. The value generated is such that when a data inverter circuit 141 becomes invalid within a time period of from the first cycle to the 512-th cycle, a value generated thereby is directly output without change. Within a period of from the 513-th cycle to 1024-th cycle, the data inverter circuit 141 becomes valid; so, the negative or "minus" value of a value generated at this time is output.

The white noise composition module 15 inputs the white noise array as a phase sequence per white-noise frequency component and performs synthesis composition of white noises. This white noise composition is such that for the purposes of removal of the periodicity and also for principal white noise conversion, what is called the inverse Fourier transformation is performed to thereby generate an output value of the real number part as a physical random number. To do this, an inverse fourier transform (IFT) circuit 151 inputs the values of a real number part $Ir[n]$ and imaginary number part $Ii[n]$ and outputs those values of a real number part $Or[n]$ and imaginary number part $Oi[n]$ which are applied the IFT processing on a per-clock cycle basis. The value of real part to be output per cycle of the clock signal B 22B is output from the white noise composition module 15 as a physical random number. The white noise composition is performed per unit period of 1024 cycles.

The white noise array generation and the white noise composition are mathematically represented by Equation 1 below. As apparent from this set of equations, 512 physical prime random number sequences are used to produce therefrom a white noise array of 1024 pieces. The white noise array has the values of a real number part and imaginary number part.
(EQU 1)
Calculation of White Noise Composition
 In the case of white noise array to be generated from 512 physical prime random numbers
Physical Prime Random Number Sequences: $S[0]$ to $S[511]$ Let $0 \leq S[n] \leq 1 (0 \leq n \leq 511)$ IFT Real Part Input: $Ir[0\text{-}1023]$
IFT Imaginary Part Input: $Ii[0\text{-}1023]$ $Ir[0]Ir[512]=0$ $Ii[0]=Ii[512]=0$ $Ir[n]=S[n] (1 \leq n \leq 511)$ $Ii[n]=\sqrt{(1-S[n]^2)} (1 \leq n \leq 511)$ $Ir[n]=S[1024-n] (513 \leq n \leq 1023)$ $Ii[n]=1 \times \sqrt{(1-S[1024-n]^2)} (513 \leq n \leq 1023)$ IFT Real Part Output: $Or[0\text{-}1023]$ ... White Noise (Physical Random Number)
IFT Imaginary Part Output: $Oi[0\text{-}1023]$ ... Annulled Table 1 presented below is the one that shows the values of the real number part and imaginary number part of the white noise array generated by Equation 1. As shown in Table 1, the values of those real parts of the second to 512-th items of the array of 1024 pieces are set to prime random numbers greater than or equal to 0 and less than 1, which are generated from bit streams of respective ones of the second to 512-th physical prime random number sequences in 512 physical prime random number sequences; the values of real parts of from the 513 to 1024-th of the array are set at prime random numbers greater than or equal to 0 and less than 1, which are produced from the bit streams of respective ones of the 512-th to second physical prime random number sequences by reversing the order of the above-stated 512 physical prime random number sequences. Regarding imaginary number parts of the second to 512-th items, each is equal to the square root of a difference between 1 and the squared value of a prime random number which is greater than or equal to 0 and yet less than 1 and which was generated from the bit stream of its corresponding one of the second to 512-th physical prime random number sequences in the 512 physical prime random number sequences; as for imaginary parts of the 513-th to 1024-th items, each is set to a negative or "minus" value of the square root of a difference between 1 and the squared value of a prime random number which is more than or equal to 0 and less than 1 and which was generated from the bit stream of its corresponding one of the order-reversed version of 512 physical prime random number sequences, i.e., the 512-th to second physical prime random number sequences. The first and 513-th items of this array are zeroed both in real part and in imaginary part thereof.

(Table 1)
White Noise Array Generation
  Generating from 512 physical prime random numbers
  Value of white noise array of 1024 pieces
Physical Prime Random Number Sequences: $S[0]$ to $S[511]$ Let $0 \leq S[n] \leq 1 (0 \leq n \leq 511)$ IFT Real Part Input: $Ir[0\text{-}1023]$
IFT Imaginary Part Input: $Ii[0\text{-}1023]$

| n | Ir | Ii |
|---|---|---|
| 0 | 0 | 0 |
| 1 | $S[1]$ | $\sqrt{(1-S[1]^2)}$ |
| ⋮ | ⋮ | ⋮ |
| 510 | $S[510]$ | $\sqrt{(1-S[510]^2)}$ |
| 511 | $S[511]$ | $\sqrt{(1-S[510]^2)}$ |
| 512 | 0 | 0 |
| 513 | $S[511]$ | $-1 \times \sqrt{(1-S[511]^2)}$ |
| ⋮ | ⋮ | ⋮ |
| 1022 | $S[2]$ | $-1 \times \sqrt{(1-S[2]^2)}$ |
| 1023 | $S[1]$ | $-1 \times \sqrt{(1-S[1]^2)}$ |

Letting the generated white noise array of 1024 pieces be an input, the white noise composition is performed based on the IFT processing to thereby generate from output values of real number parts a set of 1024 physical random numbers. Those physical random numbers as output from respective white noise composition modules 15 are sent together to the physical random number data sum-up unit 16. In this unit 16, bit streams of such plurality of physical random numbers are lined up or "queued" and then saved in a shift register 17 shown in FIG. 1. Which one of them is saved at which portion is instructed by the control unit 19. The shift register 17 operates in synchronism with the clock signal B 22B to perform a shifting operation and writing of the physical random number data as output from each white noise composition module 15. The shift register 17 sends the physical random number data to a physical random number data buffer 18 whereas the random number assembly control unit 19 issues a write instruction and sends it to the physical random number data buffer 18. The physical random number data buffer 18 stores therein the physical random number data from the shift register 17 upon receipt of the write instruction. The physical random number data buffer 18 is responsive to receipt of a read request as externally transmitted thereto, for functioning to output physical random number data 20 and also erase the output physical random number data 20; additionally, this buffer 18 has an interconnect interface with respect to a general-purpose or "universal" bus or the like, thereby enabling the physical random number data to be supplied to any given external equipment or apparatus.

Figure 2:
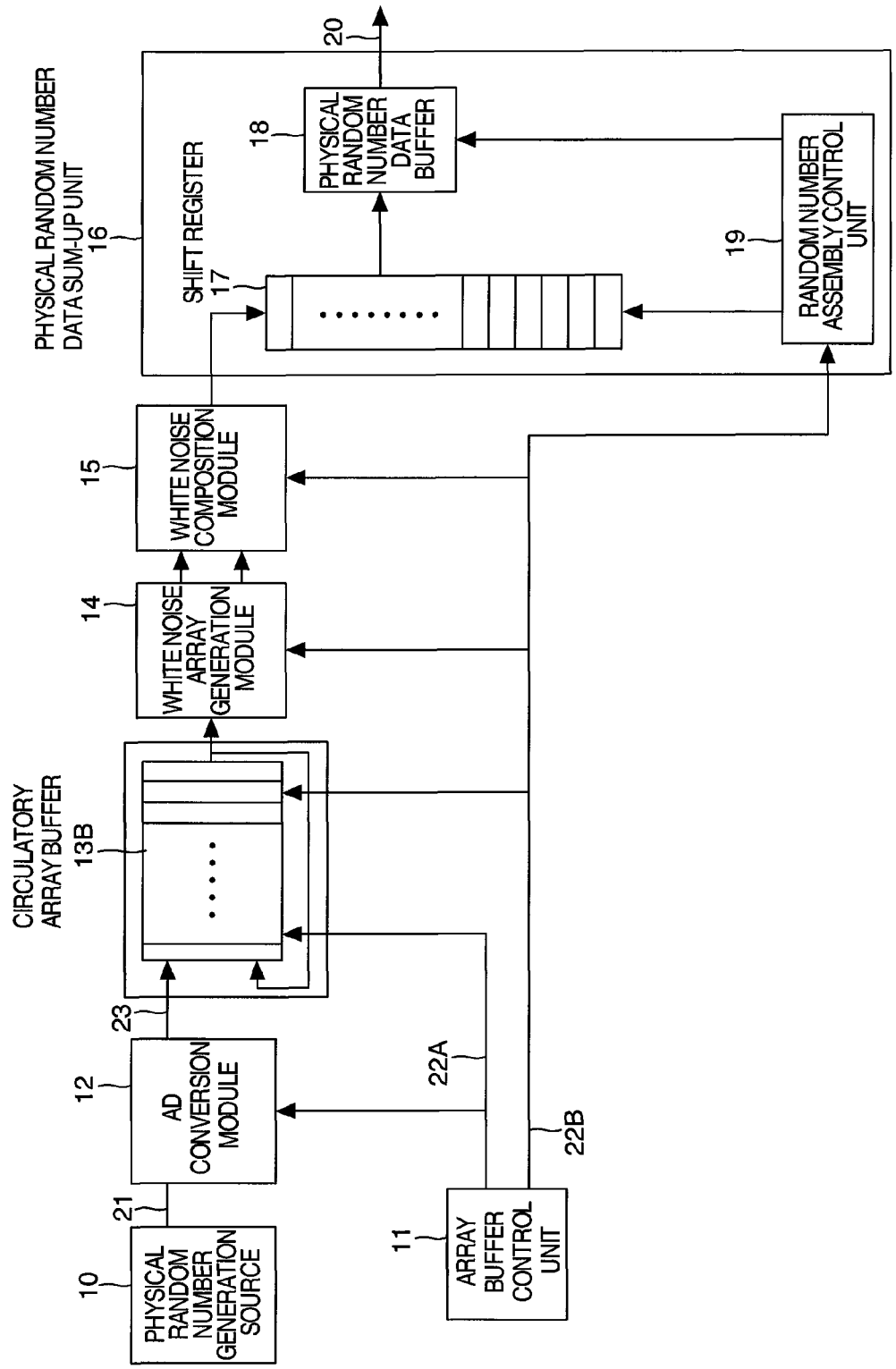
FIG. 2 is a diagram showing an overall configuration of a physical random number generation device in accordance with a modified example of the device shown in FIG. 1.

FIG. 2 is a diagram showing an overall configuration of a modified example of the above-stated physical random number generator device shown in FIG. 1. In the configuration of FIG. 2, one or more physical prime random numbers 23 generated are stored in a circulatory array buffer 13B, which is provided in the physical prime random number sequence generation module 13. More specifically, a single physical prime random number sequence is stored in the circulatory array buffer 13B. With this physical prime random number sequence as an input, the white noise array generation module 14 operates to generate a white noise array as a sequence of spectral phases of physical phenomena having the same strength of every spectrum. After having performed white noise composition using this numerical sequence, the numeric sequence is forced to circulate, thereby causing it to become a different physical prime random number sequence. From this new physical prime random number sequence, a new white noise array is creatable in the white noise array generation module 14. Using the resultant white noise array that was prepared from the circulated physical prime random number sequence as an input, the white noise composition is again performed to generate a physical random number(s). A white noise composition method as used herein is arranged to employ the above-stated set of equations as previously indicated in EQU1. By circulation of the physical prime random number sequence, it becomes possible to perform multiple white noise composition operations by a single unit of white noise composition module 15 while at the same time enabling the use of a frequency-increased clock signal which exhibits a speed that is several times greater than the write rate of the physical prime random number 23. It is also possible to retain enhanced physical random number generation capability while lessening or minimizing the scale of electrical/electronic circuitry used therefor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A physical random number generation device comprising:

a physical random number generation source which generates a white noise;

an analog-to-digital conversion unit which takes an analog signal of the white noise as an input and converts the analog signal of the white noise to digital data of a first physical random number;

a physical random number sequence generation unit which takes a plurality of the first physical random numbers as an input and generates a first physical random number sequence;

a white noise array generation unit which takes the first physical random number sequence as an input and generates a white noise array;

a white noise composition unit which takes the white noise array as an input and generates a plurality of second physical random numbers; and an external output interface which externally outputs the plurality of second physical random numbers thus generated as physical random number data.

2. A physical random number generation device according to claim 1, wherein said white noise array generation unit generates the white noise array having a real number part and an imaginary number part from the first physical random number sequence as input from said physical random number sequence generation unit, and wherein said white noise composition unit applies an inverse Fourier transformation to the white noise array to thereby output an output value of the imaginary number part as each of the physical random number.

3. A physical random number generation device according to claim 1, wherein said physical random number generation unit has an array buffer, sequentially stores individual ones of the first physical random numbers in the array buffer in response to a first clock signal with a predetermined frequency, and sequentially outputs the stored first physical random numbers from said array buffer in response to a second clock signal with a frequency higher than the predetermined frequency.

4. A physical random number generation device according to claim 3, wherein said physical random number generation device comprises a plurality of sets, each set including a physical random number sequence generation unit, a white noise array generation unit and a white noise composition unit, wherein the same first physical random number is input to each physical random number sequence generation unit from said analog-to-digital conversion unit, and wherein an initial value of a physical random number storage pointer is changed per array buffer of each physical random number sequence generation unit to thereby generate a different first physical random number sequence.

* * * * *